(12) United States Patent
Wang et al.

(10) Patent No.: US 10,462,811 B2
(45) Date of Patent: Oct. 29, 2019

(54) TRANSMITTER AND RECEIVER FOR A WIRELESS COMMUNICATION SYSTEM

(71) Applicant: Huawei Technologies Co., Ltd., Shenzhen (CN)

(72) Inventors: Fan Wang, Shanghai (CN); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/896,050

(22) Filed: Feb. 13, 2018

(65) Prior Publication Data

US 2018/0176944 A1 Jun. 21, 2018

Related U.S. Application Data

(63) Continuation of application No. PCT/EP2015/068673, filed on Aug. 13, 2015.

(51) Int. Cl.
*H04W 72/12* (2009.01)
*H04W 74/08* (2009.01)
*H04W 48/16* (2009.01)
*H04W 72/04* (2009.01)
*H04L 5/00* (2006.01)

(52) U.S. Cl.
CPC ....... *H04W 72/1289* (2013.01); *H04W 48/16* (2013.01); *H04W 72/0446* (2013.01); *H04W 74/0808* (2013.01); *H04W 74/0825* (2013.01); *H04L 5/0048* (2013.01)

(58) Field of Classification Search
CPC ............. H04W 72/1289; H04W 48/16; H04W 72/0446; H04W 74/0808; H04W 74/0825; H04L 5/0048
See application file for complete search history.

(56) References Cited

U.S. PATENT DOCUMENTS

| 2007/0081489 | A1 | 4/2007 | Anderson et al. |
| 2010/0227622 | A1 | 9/2010 | Mody et al. |
| 2014/0010089 | A1* | 1/2014 | Cai ........................ H04W 48/16 370/241 |
| 2015/0055541 | A1 | 2/2015 | Zhang et al. |
| 2015/0223245 | A1 | 8/2015 | Cheng et al. |

FOREIGN PATENT DOCUMENTS

| CN | 102300218 A | 12/2011 |
| CN | 104219776 A | 12/2014 |

OTHER PUBLICATIONS

"Qualcomm Research LTE in Unlicensed Spectrum: Harmonious Coexistence with Wi-Fi", Qualcomm Technologies, Inc (Jun. 2014).
(Continued)

*Primary Examiner* — Ian N Moore
*Assistant Examiner* — Brian T Le
(74) *Attorney, Agent, or Firm* — Leydig, Voit & Mayer, Ltd.

(57) ABSTRACT

The embodiments of the present invention presents a transmitter for a wireless communication system, configured to stop a transmission of a first downlink burst such that it ends before a predetermined gap interval before a downlink subframe in a Discovery signal Measurement Timing Configuration (DMTC) window of the wireless communication system.

17 Claims, 4 Drawing Sheets

(56) References Cited

OTHER PUBLICATIONS

"3rd Generation Partnership Project; Technical Specification Group Radio Access Network; Study on Licensed-Assisted Access to Unlicensed Spectrum; (Release 13)," 3GPP TR 36.889, V13.0.0, pp. 1-87, 3rd Generation Partnership Project, Valbonne, France (Jun. 2015).

"Electromagnetic compatibility and Radio spectrum Matters (ERM); Wideband transmission systems; Data transmission equipment operating in the 2, 4 GHz ISM band and using wide band modulation techniques; Harmonized EN covering the essential requirements of article 3.2 of the R&TTE Directive," ETSI EN 300 328, V1.9.1, pp, 1-91, Harmonized European Standard, European Telecommunications Standards Institute, Sophia Antipolis Cedex, France (Feb. 2015).

"Views on LBT and frequency reuse mechanism for LAA DL transmission," 3GPP TSG RAN WG1 Meeting #81, Fukuoka, Japan, R1-153179, 3rd Generation Partnership Project, Valbonne, France (May 25-29, 2015).

* cited by examiner

TRANSMITTER AND RECEIVER FOR A WIRELESS COMMUNICATION SYSTEM

CROSS-REFERENCE TO RELATED APPLICATIONS

This application is a continuation of International Patent Application No. PCT/EP2015/068673, filed on Aug. 13, 2015, the disclosure of which is hereby incorporated by reference in its entirety.

TECHNICAL FIELD

The embodiments of the present invention relates to a transmitter and a receiver for a wireless communication system. The embodiments of the present invention also relates to a method for transmitting a first downlink burst and to a computer-readable storage medium storing program code, the program code comprising instructions for carrying out such a method.

BACKGROUND

The 3rd Generation Partnership Project (3GPP) started a release 13 Long Term Evolution (LTE) study item, Licensed Assisted Access (LAA) with at least one licensed carrier as the primary cell (PCell) and at least one unlicensed carrier as the secondary cell (SCell), aiming to use the unlicensed spectrum, on which WiFi is currently deployed. It is observed that LTE significantly impacts WiFi performance in LTE-WiFi coexistence case, if current LTE functionalities are assumed. One major reason is that WiFi follows Listen-Before-Talk (LBT) principle, which specifies that a transmitting Node can only start transmitting after it has performed Clear Channel Assessment (CCA) and measured that the channel is idle, while a legacy LTE Node does not perform CCA and may transmit continuously. An important problem for LTE Release 13 LAA is how to achieve fair and effective coexistence with Wi-Fi, and among LAA networks deployed by different operators. To ensure fair co-existence with WiFi, LTE needs to be modified to also support LBT on the unlicensed band.

There are basically two types of LBT mechanisms, Frame Based Equipment (FBE) and Load Based Equipment (LBE), where for FBE only one CCA phase is needed and the CCA is performed in pre-defined fixed timeline, thus resulting in a fixed starting time for downlink transmission, while for LBE both CCA phase and extended CCA phase are needed and the CCA may happen at any time resulting in flexible starting times for downlink transmissions.

As specified in ETSI EN 300 328, for FBE, before transmission, the equipment shall perform a Clear Channel Assessment (CCA) check. The equipment shall observe the operating channel for the duration of the CCA observation time which shall be not less than 20 μs. If the equipment finds the channel occupied, it shall not transmit on this channel during the next Fixed Frame Period. The total time during which an equipment has transmissions on a given channel without re-evaluating the availability of that channel, is defined as the Channel Occupancy Time. The Channel Occupancy Time shall be in the range 1 ms to 10 ms followed by an Idle Period of at least 5% of the Channel Occupancy Time used in the equipment for the current Fixed Frame Period.

For LBE, initial CCA is performed before using the channel and CCA observation time is minimum 20 μs. If the equipment finds the channel to be clear, it may transmit immediately. If the equipment finds the channel occupied, it shall not transmit on this channel. The equipment shall perform an Extended CCA check in which the channel is observed for the duration of a random factor R multiplied by the CCA observation time. N defines the number of clear idle slots resulting in a total Idle Period that needs to be observed before initiation of the transmission, where a slot can be interpreted as a time unit the equipment determines the medium is busy or idle. The value of N shall be randomly selected in the range 1 . . . q every time an Extended CCA is required and the value stored in a counter. The value of q is selected by the manufacturer in the range 4 . . . 32. The counter is decremented every time a CCA slot is considered to be 'unoccupied'. When the counter reaches zero, the equipment may transmit. This Channel Occupancy Time shall be less than $(13/32) \times q$ ms, with q as defined above, after which the device shall perform the Extended CCA described.

SUMMARY OF THE INVENTION

The objective of the embodiments of the present invention is to provide a transmitter and a receiver wherein the transmitter and the receiver overcome one or more of the problems of the prior art. In particular, an object of the embodiments of the present invention can include addressing the problem of inefficient channel contention for downlink data transmission, the problem of DRS transmission especially concerning mismatch of the DRS subframe pattern and start of a downlink burst, and/or the problem of inefficient use of a transmission opportunity.

A first aspect of the disclosure provides a transmitter for a wireless communication system, configured to stop a transmission of a first downlink burst such that it ends before a predetermined gap interval before a downlink subframe in a Discovery signal Measurement Timing Configuration, DMTC, window of the wireless communication system. DMTC window is also known as DMTC occasion.

The transmitter of the first aspect ensures that a downlink burst is stopped before the predetermined gap interval, such that no downlink transmission occurs during the gap interval.

Which of the subframes is preceded by the gap interval can be pre-defined or network configured. For example, it can be defined as one of candidate transmit intervals for DRS within the DMTC window. This provides the advantage that a downlink burst before the DMTC window may better make use of the maximum occupancy time by not stopping at the first subframe in the DMTC window, while still being able to provide some empty time for other eNBs sensing the channel in the remaining time after the downlink transmission ending at a previous subframe in the DMTC window.

A downlink burst in the embodiments of the present invention can refer to any downlink transmission from the time an eNodeB starts a downlink transmission after CCA success to the time the eNodeB ends the transmission and starts CCA again.

Preferably, the transmission of a downlink burst, e.g. a downlink burst containing PDSCH, is stopped at a gap which starts a certain time, e.g. at least the duration of the predetermined gap interval, before a downlink subframe in the DMTC window, where said downlink burst starts at a time which is outside of the DMTC window, and a DRS specific LBT is performed after the end of said downlink burst transmission. A DRS specific LBT could be either FBE based or LBE based, with the restriction that the start position of a downlink burst can only be time aligned with the DRS pattern, e.g. at the start of subframe boundary as Rel-12 DRS.

In a first implementation of the transmitter according to the first aspect, the transmitter is further configured to start the first downlink burst at a first point in time and stop the first downlink burst at a second point in time, wherein a time interval between the first point in time and the second point in time is not longer than a predetermined maximum burst duration, and a time interval between the first point in time and the downlink subframe is not longer than a sum of the maximum burst duration and a duration of the predetermined gap interval.

In a second implementation of the transmitter according to the first aspect, the downlink subframe is one of:
a first subframe in the DMTC window and
a candidate transmit interval for a discovery signal in the DMTC window.

There are several advantages in stopping the downlink burst starting in a subframe not in the DMTC window at a gap interval before the first downlink subframe in the DMTC window. First, it allows LBE based LBT for data transmission outside of the DMTC window where a DMTC window, e.g. 6 ms in LTE Rel-12, is usually quite short compared to the DMTC periodicity, e.g. no less than 40 ms in LTE Rel-12, therefore beneficial in terms of channel contention for most of time. Second, it allows to support a DRS-specific LBT mechanism which could be used to align the start of transmission with the DRS pattern, e.g., FBE based LBT. Third, it avoids the downlink transmission continuous from a time before the first subframe of the DMTC window to the first subframe, therefore it helps all the eNBs especially in a synchronized network to sense the channel as idle and starts downlink transmission of DRS.

In a third implementation of the transmitter according to the first aspect, a duration of the predetermined gap interval corresponds to one of an idle period, a Clear Channel Assessment, CCA, duration, a CCA slot time, and a CCA observation time There are several options to choose the duration of the gap interval. One option is that the DRS-specific LBT is FBE based LBT and the duration of the gap interval equals the Idle Period.

A second option is that the DRS-specific LBT is LBE based LBT and the duration of the gap interval equals the initial CCA duration, which is also known as the idle sensing interval, the idle sensing period.

A third option is that the duration of the gap interval is zero, which could be used in a case a new DRS pattern is introduced to allow some blank OFDM symbols in the beginning of the subframe for channel sensing. If the gap interval is set to zero or close to zero, no further transmissions are possible during the gap interval. However, it is still ensured that a downlink burst ends before the beginning of the DMTC window.

In a fourth implementation of the transmitter according to the first aspect, the transmitter is further configured to transmit a second downlink burst in the DMTC window using listen-before-talk, LBT, based on
Frame Based Equipment, FBE, or
Load Based Equipment, LBE, wherein a transmission of the second downlink burst within the DMTC window is started time-aligned or subframe-aligned with a discovery signal transmission interval. Here subframe-aligned means that the difference of the start time of the downlink burst and the discovery signal transmission interval is of an integer multiple of subframes.

Preferably, a DRS specific LBT in the DMTC window can be either FBE based or LBE based, with the restriction that the start position of a downlink burst can only be time aligned with the DRS pattern, e.g. at the start of subframe boundary as Rel-12 DRS.

In a fifth implementation of the transmitter according to the first aspect, the transmitter is configured to use LBE based LBT in the DMTC window with a first defer period and LBE Based LBT outside of the DMTC window with a second defer period, wherein the first and second defer period are derived differently.

A WiFi system can use LBE based LBT with some modifications to better suit WiFi channels and signals, e.g. an introduction of a defer period in eCCA measurement resulting in a channel sensing time no less than 34 us for optimizing transmission of several channels/signals. A defer period can be interpreted as the minimum time that a node has to wait after the channel becomes idle before transmission, i.e., a node can transmit if the channel is sensed to be idle for ≥ defer period. A WiFi node always defers until channel is idle for 34 us before counting down the eCCA counter.

In a sixth implementation of the transmitter according to the first aspect, the transmitter is configured to transmit a discovery signal in the second downlink burst only if the second downlink burst starts within the DMTC window.

This has the advantage that an easy design of downlink bursts containing DRS as well as an easy design of downlink bursts not containing DRS is possible. The DRS subframe pattern and the PDSCH subframe pattern would be different to be adaptive to different LBT mechanisms used. By allowing the DRS transmission only in a downlink burst starting from the DMTC window it avoids the situation that a downlink burst starting outside of the DMTC window contains PDSCH and DRS together, which means two different subframes should be supported. This may increase the complexity, e.g. the collision of cell specific reference signals antenna port 0, as the time frequency location may be different for a PDSCH subframe in LAA and DRS subframe in LAA.

In a seventh implementation of the transmitter according to the first aspect, the transmitter is configured to
determine whether a discovery signal has been transmitted already in a subframe of the DMTC window, and
transmit a third downlink burst which starts in the DMTC window and that does not comprise a discovery signal only if it is determined that a discovery signal has been transmitted already in the DMTC window.

Thus, it is ensured that the third downlink burst does not have a priority over a transmission of a discovery signal while also allowing a downlink burst not containing DRS starts in the DMTC window. This has the advantage that the transmission of discovery signal is always prioritized over a non-DRS burst in the DMTC window and it is still possible to transmit PDSCH if a DRS is already transmitted.

A second aspect of the disclosure refers to a receiver for a wireless communication system, configured to receive a first downlink burst assuming the first downlink burst ends before a predetermined gap interval before a downlink subframe in a Discovery signal Measurement Timing Configuration, DMTC, window of the wireless communication system.

The receiver can be configured to derive the end of the downlink burst by assuming it ends at a certain point. With this information, the receiver could do correct decoding. Otherwise the UE may misunderstand the end point of the burst, which may cause problem in the decoding, e.g. taking noise as signal. If you go ahead with the draft description for other parts, I will add the relevant content when the draft is available.

The receiver of the second aspect of the disclosure could be implemented e.g., in a mobile User Equipment (UE). The UE may be configured to be notified of DMTC window timing and of the location and duration of the gap interval from the network. The gap interval could also be pre-defined, e.g. the absolute value is explicitly written in a specification.

The UE may derive the start time of a downlink burst by receiving the signals sent from the eNB, e.g., downlink control signaling. To correctly decode the downlink burst, especially the last transport block of the downlink burst, the UE also needs to derive the end time of the downlink burst. The end position may be derived by the UE from the maximum occupancy time restriction or indicated by the network, e.g. the difference between the start time and the end time is not above the maximum occupancy time. In addition, as the downlink burst has to stop before a predetermined gap interval before a downlink subframe in a Discovery signal Measurement Timing Configuration window the burst duration shall both satisfy that it is not longer the maximum occupancy time and the time difference between the end time and the start time of the downlink subframe in the DMTC window is not shorter than the gap interval.

One example is that the burst starts at B_start and the UE derives the end time as B_end=min(B_start+_max, T_start−T_gap), where B_max is the the maximum occupancy time, T_start is the start time of the downlink subframe in the DMTC window, T_gap is the duration of the gap interval. It should be noted this restriction corresponds to the upper bound of the burst duration. Further restriction may be introduced to stop the burst even earlier, for example, when there is no data scheduled to make full use of the total available time or the last TTI is a partial TTI or subframe less than 1 ms.

A third aspect of the disclosure refers to a method for transmitting a first downlink burst in a wireless communication system, comprising a step of stopping the first downlink burst such that it ends before a predetermined gap interval before a downlink subframe in a Discovery signal Measurement Timing Configuration, DMTC, window of the wireless communication system.

In a first implementation of the method of the third aspect, the downlink subframe is one of:
 a first subframe in the DMTC window and
 a candidate transmit interval for a discovery signal in the DMTC window.

In a second implementation of the method of the third aspect, the method further comprises a step of transmitting a second downlink burst in the DMTC window using listen-before-talk, LBT, based on
 Frame Based Equipment, FBE, or
 Load Based Equipment, LBE, wherein a transmission of the second downlink burst within the DMTC window is started time-aligned or subframe-aligned with a discovery signal transmission interval.

In a third implementation of the method of the third aspect, a duration of the predetermined gap interval corresponds to an idle period, a CCA duration, a CCA slot time, or wherein a duration of the predetermined gap interval is zero.

In a fourth implementation of the method of the third aspect, the method further comprises:

determining whether a discovery signal has been transmitted already in a subframe of the DMTC window, and transmitting a third downlink burst which starts in the DMTC window and that does not comprise a discovery signal only if it is determined that a discovery signal has been transmitted already in the DMTC window.

In a preferred embodiment, the method is configured to start transmitting a downlink burst containing PDSCH subject to LBT in a subframe in the DMTC window only if DRS is transmitted in the previous subframe before said downlink burst containing PDSCH.

The methods according to the third aspect of the disclosure can be performed by the transmitter according to the first aspect of the disclosure. Further features or implementations of the method according to the third aspect of the disclosure can perform the functionality of the transmitter according to the first aspect of the disclosure and its different implementation forms.

A fourth aspect of the disclosure refers to a computer-readable storage medium storing program code, the program code comprising instructions for carrying out the method of the third aspect or one of the implementations of the third aspect.

A further aspect of the disclosure refers to a transmitter for transmitting a downlink burst during a DMTC window, wherein the transmitter is configured to transmit a discovery signal in the downlink burst only if the downlink burst starts within the DMTC window.

A further aspect of the disclosure refers to a transmitter for a wireless communication system, wherein the transmitter is configured to:
 determine whether a discovery reference signal has been transmitted already in a subframe of the of a DMTC window, and
 transmit the downlink burst in the DMTC window only if it is determined that a DRS has been transmitted already.

BRIEF DESCRIPTION OF THE DRAWINGS

To illustrate the technical features of embodiments of the embodiments of the present invention more clearly, the accompanying drawings provided for describing the embodiments are introduced briefly in the following. The accompanying drawings in the following description are merely some embodiments of the present invention, but modifications on these embodiments are possible without departing from the scope of the embodiments of the present invention as defined in the claims.

DETAILED DESCRIPTION OF THE EMBODIMENTS

Figure 1:
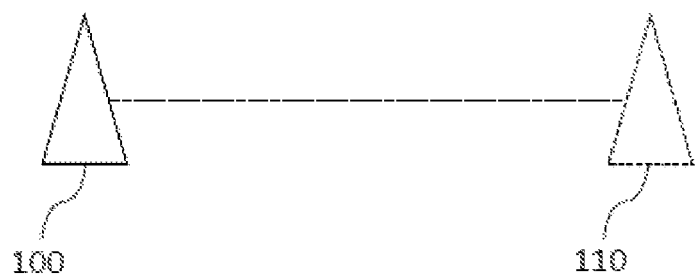
FIG. 1 is a block diagram illustrating a transmitter in accordance with an embodiment of the present invention.

FIG. 1 is a block diagram illustrating a transmitter 100 in accordance with an embodiment of the present invention. The transmitter 100 is optionally transmitting a signal towards at least one second device 110. The transmitter 100 may be configured to receive an indication of a DMTC window timing from the at least one second device 110. To this end, the transmitter 100 may optionally comprise a receiver, wherein the receiver may be configured to receive DMTC window timing information.

Figure 2:
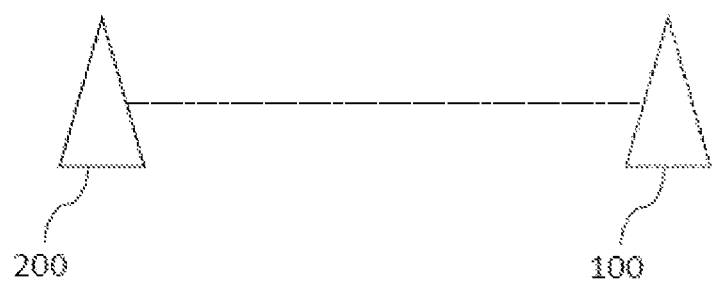
FIG. 2 is a block diagram illustrating a receiver in accordance with a further embodiment of the present invention.

FIG. 2 is a block diagram illustrating a receiver 200 in accordance with an embodiment of the present invention. The receiver 200 may be configured to receive signals from a transmitter 100, indicated with dashed lines in FIG. 2. The transmitter 100 may be the receiver shown in FIG. 1 or a different transmitter. The transmitter 100 and receiver 200 shown in FIG. 2 may both be configured to receive DMTC window timing information from a third device. Transmitter 100, receiver 200 and the third device may be part of a wireless communication system.

Figure 3:
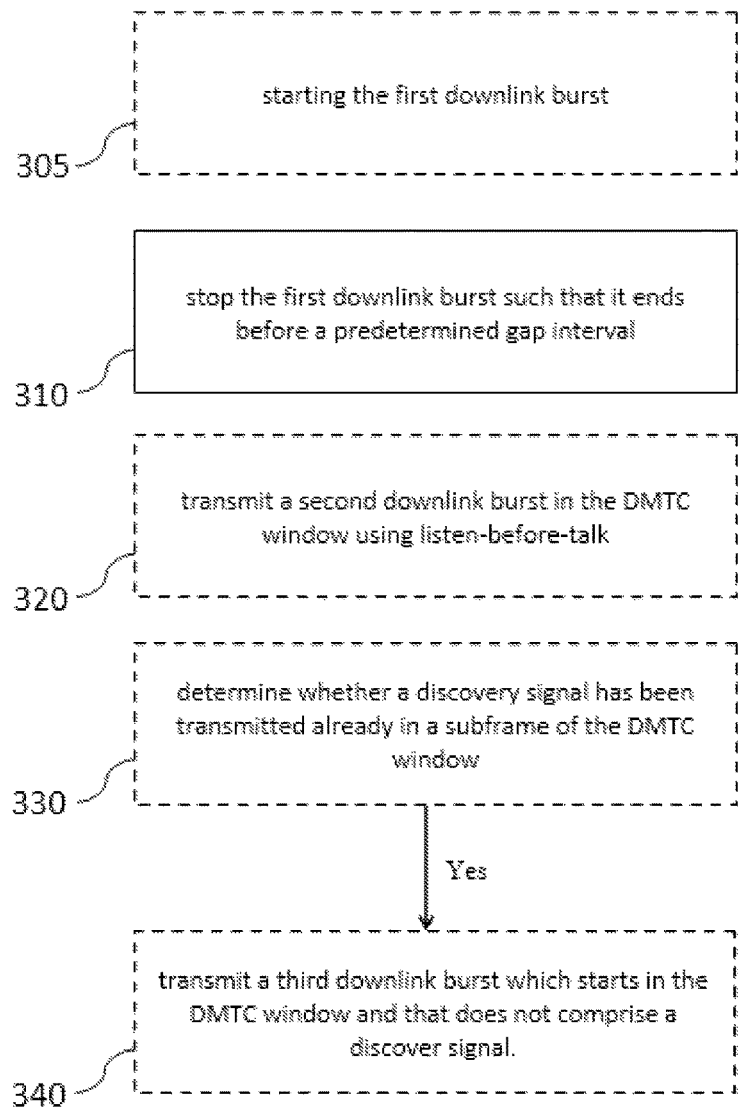
FIG. 3 is a flow chart of a method for transmitting a first downlink burst in accordance with an embodiment of the present invention.

FIG. 3 is a flow chart of a method for transmitting a first downlink burst in accordance with an embodiment of the present invention. The method comprises a step 310 of stopping a first downlink burst such that it ends before a predetermined gap interval before a downlink subframe in a Discovery signal Measurement Timing Configuration, DMTC, window of the wireless communication system.

Optionally, the method may further comprise an initial step 305 of starting the first downlink burst at a first point in time, wherein a time interval between the first point in time and the second point in time (when the downlink burst is stopped) is not longer than a predetermined maximum burst duration, and a time interval between the first point in time and the downlink subframe is not longer than a sum of the maximum burst duration and a duration of the predetermined gap interval.

It should be noted that the starting and the stopping of the downlink burst could be performed by different devices.

Further, the method may optionally comprise a step 320 of transmitting a second downlink burst in the DMTC window using listen-before-talk, LBT. Transmitting the second downlink burst may be based on FBE. Alternatively, it can be based on LBE, wherein a transmission of the second downlink burst within the DMTC window is started time-aligned or subframe-aligned with a discovery signal transmission interval.

The method may further optionally comprise a step 330 of determining whether a discovery signal has been transmitted already in a subframe of the DMTC window.

If it is determined in step 330 that a discovery signal has been transmitted already in the DMTC window, the method may further involve, in a step 340, transmitting a third downlink burst which starts in the DMTC window and that does not comprise a discover signal.

If it is determined in step 330 that a discovery signal has not already been transmitted in the DMTC window, the method may further involve (not shown in FIG. 3) that the transmission of the third downlink burst is postponed to a further DMTC window.

Advantages of the method as illustrated in FIG. 3 can best be understood by comparing with some alternative solutions.

The LAA system typically assumes carrier aggregation where the LAA carrier serves as the Secondary Cell (SCell) in the unlicensed band. LAA carrier shall support LTE related functionalities like RRM measurements and data transmission, by transmitting physical channels and/or signals. To support RRM measurements like RSRP/RSRQ as well as cell identification/synchronization, some kind of signals, e.g. discovery reference signals (DRS) also referred as discovery signal, are transmitted periodically. Discovery reference signals, as specified in LTE Release 12, consist of PSS, SSS, CRS and CSI-RS (if configured). Discovery reference signals are sent once in a configurable periodicity indicated in Discovery signal Measurement Timing Configuration (DMTC) with a duration of up to 5 subframes from the eNB even when the cell is de-activated to help UE to do RRM measurements. A DMTC occasion, also referred as DMTC window, is 6 ms. A subframe is defined as two consecutive slots where each slot is 0.5 ms.

In addition, non-DRS physical channels and signals (PDSCH, CRS, CSI-RS, UE-reference signals and PDCCH/EPDCCH, or a subset of them) are also transmitted for data transmission. Any physical channels or signals are transmitted in one or several subframes.

As current LTE functionality does not support LBT, a new solution shall be introduced to LTE for LAA carrier to achieve fair and effective co-existence for WiFi with LAA, and LAA with LAA.

In one alternative solution, the LAA eNB performs FBE based LBT for downlink burst transmission all the time, where a downlink burst refers to any downlink transmission from the time the eNB starts downlink transmission after CCA success to the time the eNB ends the transmission and starts CCA again, including any physical channels and signals. CCA is performed in the end of IDLE period and a downlink burst starts at the beginning of the fixed frame period. With this option, it could be very easy to support LTE subframe based transmission framework by time aligning the FBE fixed frame period with one or several LTE subframes.

One problem of using FBE based LBT for LAA downlink always is reduced transmission opportunity. As the CCA opportunity is restricted while LBE basically does not have this restriction, it is observed LBE outperforms FBE at least in the heavy traffic load. There would be a more severe performance loss in a FBE-LAA system when coexisting with a WiFi system using LBE, as WiFi nodes tend to occupy the channel much easier than LAA eNBs due to more CCA opportunities.

In another alternative solution, the LAA eNB performs LBE based LBT for downlink burst transmission all the time. LBE parameters, like CCA observation time and a defer period similar as WiFi, could be carefully selected to better co-exist with WiFi while also comply with regulations. In addition, LAA needs to introduce a new mechanism to support data transmission not from the subframe boundary to ensure LAA system performance, e.g. immediate data transmission after CCA success. Otherwise the LAA eNB needs to transmit some signals or physical channels other than data channels from the CCA success time to the next subframe boundary, causing high overhead. As for the transmission of DRS for RRM measurements, DRS is opportunistically periodically transmitted in the DRS occasion subject to LBE based LBT. With this option, LAA could achieve good co-existence with WiFi as well as good effectiveness in terms of LTE downlink data transmission.

One problem of using LBE based LBT for LAA downlink always is reduced DRS transmission opportunity or reduced measurement performance. Unlike PDSCH or other signals mainly for intra-cell detection, DRS shall be used also for inter-cell RRM measurement and acquisition of time information, and therefore would better be at constant time position of a subframe, i.e. fixed pattern in a subframe. DRS transmission with fixed pattern does not fit into LBE based LBT which results in flexible starting point in a subframe. If CCA success is before the DRS subframe, typical LBT mechanism may transmit some signals other than DRS at least for reserving the channel, such as reservation signal or PDSCH. The transmission of any signals before DRS is seen as interference by other LAA eNBs and may result in other LAA eNBs measuring the channel as occupied, further resulting in DRS from other LAA eNB not transmitted, i.e. reduced DRS transmission opportunity. If CCA success is within a DRS subframe, the eNB either does not transmit DRS which results in reduced DRS transmission opportunity, or transmits partial DRS by dropping the previous OFDM symbols, which results in reduced measurement performance.

In yet another alternative solution, the LAA eNB performs FBE based LBT in the DMTC window while LBE based LBT outside of the DMTC window. With this option, the LBT outcome may well suit the DRS subframe in the DMTC window as FBE is assumed, meanwhile data transmission opportunity could be ensured during the time outside of the DMTC window as LBE is assumed. See FIG. 1B. The DMTC window is 6 ms and appears once with a certain periodicity, e.g. no less than 40 ms in Rel-12. DRS may be transmitted from the subframe boundary as Rel-12 in the DMTC window.

A first problem of using FBE based LBT in the DMTC window while LBE based LBT outside of the DMTC window is reduced DRS transmission opportunity. Especially when a downlink burst spans over the subframes outside of the DMTC window and in the DMTC window, e.g. a downlink burst over a subframe outside of the DMTC window and a subsequent subframe in the DTMC window, other eNBs especially in a synchronized network, when measuring the channel in the IDLE period just before the subframe for DRS transmission, may measure the channel as busy, as shown in the figure below. A second problem is reduced spectrum efficiency. This is more relevant in case the eNB has already sent one DRS in the DMTC window, e.g. in the first subframe in the DMTC window, it may need to perform CCA again and potentially repeat the DRS transmission in the remaining 5 subframes, or alternatively may not transmit anything in the remaining 5 subframes even the CCA succeeds, which would be a waste of time-frequency resource.

Disadvantages of the above-mentioned alternative solutions can be summarized as below:

Performance loss in terms of LAA downlink data transmission in case of FBE based LBT always assumed for downlink burst transmission. FBE is inefficient in terms of channel contention as the CCA opportunity is restricted, which may bring significant performance loss in high load scenarios.

Performance loss in terms of DRS transmission opportunity or measurement performance in case LBE based LBT always assumed. If a downlink burst starts before a DRS subframe, the transmission before the DMTC window may bring interference to other eNBs causing other eNBs measuring the channel as busy, resulting in reduced DRS transmission opportunity. Or if a downlink burst starts in the middle of a DRS subframe, the eNB either does not transmit DRS which results in reduced DRS transmission opportunity, or transmits partial DRS by dropping the previous OFDM symbols, which results in reduced measurement performance.

Performance Loss in Terms of DRS Transmission Opportunity or Spectral Efficiency in case of FBE based LBT in the DMTC window while LBE based LBT outside of the DMTC window. In case a downlink burst spans over subframes outside of the DMTC window and in the DMTC window, the transmission before the DMTC window may result in other eNB measuring the channel as busy, further resulting in reduced DRS transmission opportunity. In case the eNB has already sent one DRS in the DMTC window, the eNB may have to repeat DRS transmission or not transmit anything in the remaining subframe in the DMTC window.

The method as shown in FIG. 3 and further embodiments of the embodiments of the present invention overcome one or more of these above-mentioned problems.

Figure 4:
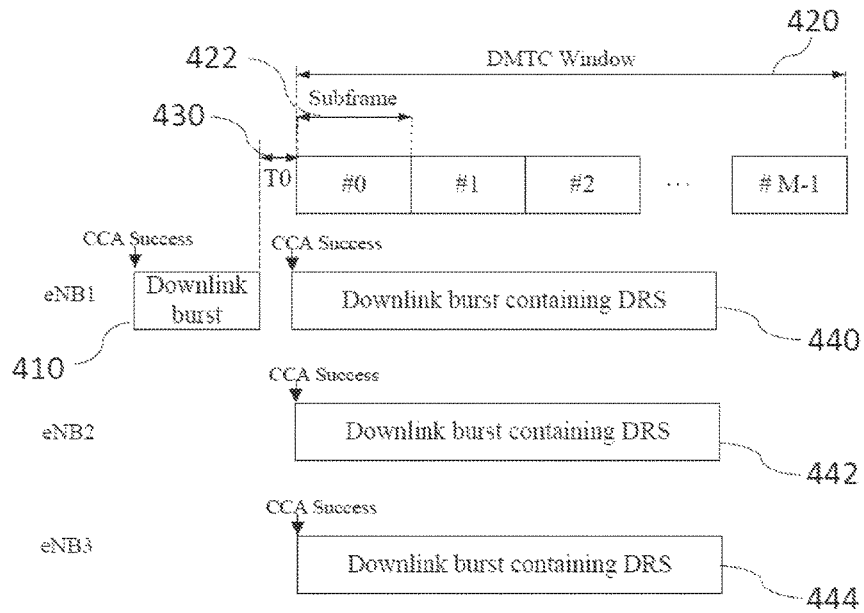
FIG. 4 is a diagram illustrating a downlink burst that stops at the beginning of a gap before a downlink subframe in a DMTC window in accordance with a further embodiment of the present invention.

A downlink Burst Stops at a Gap at Least T0 before a Downlink Subframe in the DMTC Window FIG. 4 is a diagram illustrating an embodiment where a downlink burst 410, transmitted by a first eNodeB, eNB1, stops at the beginning of a gap interval 430 before a downlink subframe 422 in a DMTC window 420. The first eNodeB, eNB1, and a second and third eNodeB, eNB2 and eNB3, transmit second downlink bursts 440, 442, and 444, each comprising DRS, at the beginning of the DMTC window 420.

This embodiment provides good channel contention capability for downlink transmission outside of the DMTC window, adapt the start of downlink burst with the DRS pattern in the DMTC window, and avoid the interference of downlink transmission closely before a subframe in the DMTC window, especially in a synchronized network.

In one embodiment the LAA eNB stops the transmission of a downlink burst at the gap interval 430 at least T0 before the downlink subframe 422 in the DMTC window, where said downlink burst is transmitted subject to an LBE based LBT which is at least used in the subframes outside of the DMTC window, and a DRS specific LBT is performed after the end of said downlink burst transmission. A DRS specific LBT could be either FBE based or LBE based, with the restriction that the start position of a downlink burst can only be time aligned with the DRS pattern, e.g. at the start of subframe boundary as Rel-12 DRS.

In one example, LAA eNB performs LBE based LBT in the subframes outside of the DMTC window 420. Once the LAA eNB measures the channel as clear, LAA eNB starts transmission of a downlink burst. The downlink burst continues to a certain time in a subframe with period at least T0 before the first downlink subframe in the DMTC window, as illustrated in FIG. 4, if the maximum occupancy time allows. After ending the downlink bust, the eNB performs a DRS-specific LBT, and starts DRS transmission if the eNB measures the channel as idle.

There are several options to choose T0. One option is that the DRS-specific LBT is FBE based LBT and T0 equals to Idle Period. A second option is that the DRS-specific LBT is LBE based LBT and T0 equals to the initial CCA duration. A third option is that T0 is ZERO, which could be used in a case a new DRS pattern is introduced to allow some blank OFDM symbols in the beginning of the subframe for channel sensing. The DRS-specific LBT is either FBE based LBT or LBE based LBT, with the restrictions that the start position of a downlink burst can only be time aligned with the DRS pattern, e.g. at the start of subframe boundary as Rel-12 DRS.

The LAA UE, which may comprise a receiver in accordance with the present invention, e.g. a receiver as shown in FIG. 2, may accordingly receive the downlink channels, or signals given the information that the LAA eNBs stops the transmission of a downlink burst at a gap at least T0 before a downlink subframe in the DMTC window.

One example is that UE assumes that there is no PDSCH transmission at a gap at least T0 before a downlink subframe in the DMTC window. One example is that the UE does not monitor a downlink grant at said downlink subframe in the DMTC window.

Figure 5:
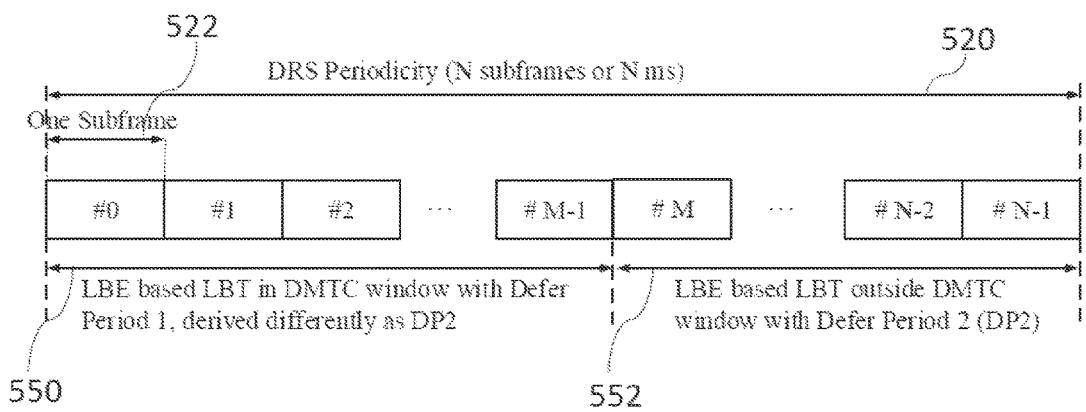
FIG. 5 is a diagram illustrating LBE based LBT being used in the DMTC window with a defer period DP1 and LBE based LBT being used outside of DMTC window with a defer period DP2, where DP1 and DP2 are derived differently.

FIG. 5 is a diagram illustrating LBE based LBT being used in a DMTC window 550 with a defer period DP1 and LBE based LBT being used in a period 552 outside of the DMTC window 550 with a second defer period DP2, where DP1 and DP2 are derived differently. Both the period 550 inside the DMTC window and the period 552 outside the DMTC period are part of an period 520 of DRS periodicity, which comprises a total of N subframes, wherein a subframe 522 can have a length of 1 ms.

In this example, the DRS-specific LBT, which could be referred as LBT process 1, performed in the DMTC window 550 is LBE based LBT. A first defer period (DP1) is derived differently as the second defer period (DP2) used in the LBE based LBT used outside of the DMTC window, which could be referred as LBT Process 2, e.g. to align the start position of a downlink burst with the DRS pattern, while the LBE based LBT used in the period 552 outside of the DMTC window 550 may use DP2 for other purpose, e.g. allow some idle time to co-exist with WiFi, or align the start position of a downlink burst with the start position(s) of non-DRS transmission. In one further example, DP1 is derived to ensure the start of downlink transmission of downlink burst in the DMTC window 550 is always the subframe boundary, i.e. the node has to wait after the channel becomes idle for a certain minimum duration, e.g. 34 us and also has to wait after the channel becomes idle till the subframe boundary, while DP2 can be derived simply based on the condition that the node has to wait after the channel becomes idle for a certain minimum duration, e.g. DP2 equal to 34 us.

This provides the advantage that a LBE based LBT could also be used for DRS transmission in the DMTC window, and also being able to align the start position of a downlink burst with the DRS pattern.

Figure 6:
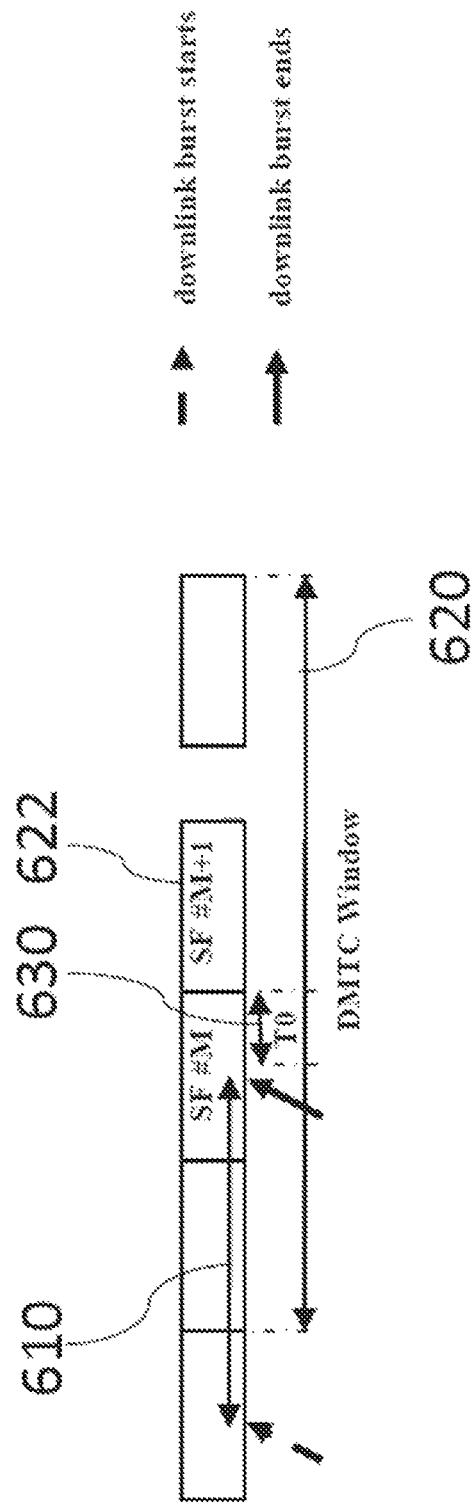
FIG. 6 is a diagram illustrating a downlink burst that stops at the beginning of a gap before a downlink subframe in the DMTC window.

FIG. 6 is a diagram illustrating a downlink burst 610 that stops at the beginning of a gap interval 630 before a downlink subframe 622 in the DMTC window 620. In this example, LAA eNB performs LBE based LBT in the subframes outside of the DMTC window 620. Once the LAA eNB measures the channel as clear, LAA eNB starts transmission of the downlink burst 610. The downlink burst 610 continues to a certain time in subframe #M with a gap interval of duration T0 before a downlink subframe #M+1, indicated with reference number 622, if the maximum occupancy time allows, where the downlink subframe #M and subframe #M+1 are two consecutive subframes in the DMTC window 620. The DRS from the eNB may or may not be transmitted in the downlink burst starting before the DMTC window. Subframe #M+1 could be pre-defined or network configured, as one of candidate transmit intervals for DRS within the DMTC window 620.

This provides the advantage that a downlink burst before the DMTC window 620 may better make use of the maximum occupancy time by not stopping at the first subframe in the DMTC window, while still being able to provide some empty time for other eNBs sensing the channel in the remaining time after the downlink transmission ending at subframe #M in the DMTC window.

A Downlink Burst not Containing DRS Happens in the DMTC Window only if DRS is Transmitted in the Previous Subframe in the DMTC Window This embodiment is to make use of the subframes in the DMTC window for PDSCH transmission, while also being able to ensure there is prioritized DRS transmission.

In one embodiment the LAA eNB starts transmission of a downlink burst (DB2) not containing DRS in the DMTC window only after it ends transmission of a downlink burst (DB1) containing DRS in the DMTC window. DB1 may either start at a time before the DMTC window, or in the DMTC window, while DB1 may either contain DRS only, or contain DRS and other physical channels and signals.

In one example, the LAA eNB configures several fixed DRS transmission intervals, e.g. subframe #0 and subframe #5 in a DMTC window of 6 subframes indexing from #0 to #5. The transmitter may transmit a discovery signal in the second downlink burst only if the second downlink burst starts within the DMTC window. In one case, the LAA eNB senses the channel as clear at subframe #0, and transmits a downlink burst containing DRS. Non-DRS physical channels and signals could either be transmitted or not transmitted along with DRS in this downlink burst. When the LAA eNB finishes the burst, and senses the channel as clear at subframe #5, the LAA eNB starts a downlink burst without DRS as the DRS is already transmitted before. In one other case, the LAA eNB senses the channel as busy at subframe #0, but senses the channel as clear at subframe #5, the eNB transmits a downlink burst containing DRS. This means that LAA eNB can transmit a downlink burst not containing DRS in a DRS interval only if there is a DRS transmission already in the previous DRS transmission interval in the same DMTC window.

In one example, the LAA eNB configures several fixed DRS transmission intervals, e.g. subframe #0 and subframe #5 in a DMTC window of 6 subframes indexing from #0 to #5. In one case, the LAA eNB senses the channel as clear at subframe #0, and transmits a downlink burst containing DRS. When the LAA eNB finishes the burst, and senses the channel as clear at subframe #3, the LAA eNB starts a downlink burst without DRS as the DRS is already transmitted before. This means that the LAA eNB can transmit a downlink without DRS burst starting in the DMTC window only if there is a DRS transmission already in the same DMTC window.

In this way it ensures that the eNB already transmits DRS one time when the first downlink burst does not contain DRS starting at a time in the DMTC window happens, which prioritizes the DRS transmission. In addition, in case DRS is already transmitted, a downlink burst containing PDSCH can be also transmitted, which also makes uses of the transmission time in the DMTC window.

The LAA UE may accordingly receive the downlink channels, or signals given the information that starts transmission of a downlink burst (DB2) not containing DRS which ends in the DMTC window only after it ends transmission a downlink burst (DB1) containing DRS in the DMTC window.

One example is that the UE does not assume there is a downlink burst (DB2) not containing DRS starting in the DMTC window unless it already receives a downlink burst (DB1) containing DRS which ends in the DMTC window. One example is that the UE does not monitor a downlink grant for PDSCH in a DMTC window unless it already detects there is DRS transmitted.

As outlined above, relevant points of the embodiments of the embodiments of the present invention include:

A downlink burst stops at a gap interval at least T0 before a downlink subframe SF1 in the DMTC window.

SF1 is the first subframe in the DMTC window, or one of the candidate transmit intervals for DRS in the DMTC window.

LBE based LBT used in the DMTC window with a defer period DP1 and LBE based LBT used outside of DMTC window with a defer period DP2, where DP1 and DP2 are derived differently.

A downlink burst containing DRS only starts within the DMTC window

A downlink burst not containing DRS in a DRS interval only if there is a DRS transmission already in the previous DRS transmission interval in the same DMTC window Some of the above-presented embodiments of the present invention provide methods for supporting LBT for LAA transmission where the following advantages are achieved:

Addressing the problem of inefficient channel contention for downlink data transmission in case FBE based LBT is always used Addressing the problem of DRS transmission especially concerning mismatch of the DRS subframe pattern and start of a downlink burst in case LBE based LBT is always used Addressing the problem of reduced DRS transmission opportunity especially concerning a downlink burst starting before a DMTC window in case a combination of FBE based LBT in the DMTC window and LBE based LBT in the DMTC window is used Addressing the problem of inefficient use of transmission opportunity by repeating DRS or not transmitting anything after a DRS transmission in the DMTC window in case a combination of FBE based LBT in the DMTC window and LBE based LBT in the DMTC window is used.

The foregoing descriptions are only implementation manners of the embodiments of the present invention, the protection of the scope of the embodiments of the present invention is not limited to this. Any variations or replacements can be easily made through person skilled in the art. Therefore, the protection scope of the embodiments of the present invention should be subject to the protection scope of the attached claims.

What is claimed is:

1. A transmitter for a wireless communication system comprising:
a processor and memory storing executable instructions that, when executed by the processor, configure the processor to provide at least the following operations:
stop a transmission of a first downlink burst such that the transmission ends prior to a predetermined gap interval that is before a downlink subframe in a discovery signal measurement timing configuration (DMTC) window of the wireless communication system; and
transmit a second downlink burst in the DMTC window using listen-before-talk (LBT) based on load based equipment (LBE);
wherein transmission of the second downlink burst within the DMTC window is started time-aligned or subframe-aligned with a discovery signal transmission interval, the LBE based LBT is used in the DMTC window with a first defer period, the LBE based LBT is used outside of the DMTC window with a second defer period and the first and second defer periods are derived differently.

2. The transmitter according to claim 1, wherein the transmitter is further configured to start the first downlink burst at a first point in time and stop the first downlink burst at a second point in time,
wherein a time interval between the first point in time and the second point in time is not longer than a predetermined maximum burst duration, and a time interval between the first point in time and the downlink subframe is shorter than or equal to a sum of the predetermined maximum burst duration and a duration of the predetermined gap interval.

3. The transmitter according to claim 1, wherein the downlink subframe is one of the following: a first subframe in the DMTC window; and a candidate transmit interval for a discovery signal in the DMTC window.

4. The transmitter according to claim 1, wherein a duration of the predetermined gap interval is associated with one of the following: an idle period, a clear channel assessment (CCA) duration, a CCA slot time, and a CCA observation time.

5. The transmitter according to claim 1, wherein a duration of the predetermined gap interval is zero.

6. The transmitter according to claim 1, wherein the transmitter is further configured to transmit a discovery signal in the second downlink burst when the second downlink burst starts within the DMTC window.

7. The transmitter according to claim 1, wherein the transmitter is further configured to:
determine whether a discovery signal has been transmitted already in a subframe of the DMTC window, and
transmit a third downlink burst which starts in the DMTC window and that does not comprise a discovery signal when it is determined that the discovery signal has been down transmitted already in the DMTC window.

8. A receiver for a wireless communication system comprising:
a processor and memory storing executable instructions that, when executed by the processor, configure the processor to provide at least the following operations:
receive a first downlink burst when the first downlink burst ends prior to a predetermined gap interval that is before a downlink subframe in a discovery signal measurement timing configuration (DMTC) window of the wireless communication system; and
receive a second downlink burst in the DMTC window using listen-before-talk (LBT) based on load based equipment (LBE);
wherein the second downlink burst within the DMTC window is started time-aligned or subframe-aligned with a discovery signal transmission interval, the LBE based LBT in the DMTC window is used with a first defer period, the LBE based LBT outside of the DMTC window is used with a second defer period and the first and second defer periods are derived differently.

9. The receiver according to claim 8, wherein the downlink subframe is one of the following: a first subframe in the DMTC window; and a candidate transmit interval for a discovery signal in the DMTC window.

10. A method for transmitting a first downlink burst in a wireless communication system, the method comprising:
stopping the first downlink burst, such that the first downlink burst ends prior to a predetermined gap interval that is before a downlink subframe in a discovery signal measurement timing configuration (DMTC) window of the wireless communication system; and transmitting a second downlink burst in the DMTC window using listen-before-talk (LBT) based on load based equipment (LBE), wherein transmission of the second downlink burst within the DMTC window is started time-aligned or subframe-aligned with a discovery signal transmission interval, the LBE based LBT is used in the DMTC window with a first defer period, the LBE based LBT is used outside of the DMTC window with a second defer period and the first and second defer periods are derived differently.

11. The method according to claim 10, wherein the downlink subframe is one of the following:
a first subframe in the DMTC window; and
a candidate transmit interval for a discovery signal in the DMTC window.

12. The method according to claim 10, wherein a duration of the predetermined gap interval is associated with one of the following:
an idle period, a clear channel assessment (CCA) duration, and a CCA slot time.

13. The method according to claim 10, wherein a duration of the predetermined gap interval is zero.

14. The method according to claim 10, further comprising:
determining whether a discovery signal has been transmitted already in a subframe of the DMTC window, and
transmitting a third downlink burst which starts in the DMTC window and that does not comprise a discovery signal when it is determined that the discovery signal has been transmitted already in the DMTC window.

15. A non-transitory computer readable medium storing program code, the program code comprising instructions which when executed by a computer of a device causes the device to implement operations for transmitting a first downlink burst in a wireless communication system, the operations including:

stopping the first downlink burst, such that the first downlink burst ends prior to a predetermined gap interval that is before a downlink subframe in a discovery signal measurement timing configuration (DMTC) window of the wireless communication system; and transmitting a second downlink burst in the DMTC window using listen-before-talk (LBT) based on load based equipment (LBE), wherein transmission of the second downlink burst within the DMTC window is started time-aligned or subframe-aligned with a discovery signal transmission interval, the LBE based LBT is used in the DMTC window with a first defer period, the LBE based LBT is used outside of the DMTC window with a second defer period and the first and second defer periods are derived differently.

16. The non-transitory computer readable medium according to claim 15, wherein the operations further include:
starting the first downlink burst at a first point in time and stopping the first downlink burst at a second point in time, wherein a time interval between the first point in time and the second point in time is shorter than or equal to a predetermined maximum burst duration, and a time interval between the first point in time and the downlink subframe is shorter than or equal to a sum of the predetermined maximum burst duration and a duration of the predetermined gap interval.

17. The non-transitory computer readable medium according to claim 15, wherein the downlink subframe is one of the following: a first subframe in the DMTC window; and a candidate transmit interval for a discovery signal in the DMTC window.

* * * * *